Patented Nov. 1, 1949

2,487,018

UNITED STATES PATENT OFFICE 2,487,018

PENICILLIN X MANUFACTURE

George F. Cartland, William J. Haines, and Nestor Bohonos, Kalamazoo, Mich., assignors to The Upjohn Company, Kalamazoo, Mich., a corporation of Michigan No Drawing. Application August 3, 1945,
Serial No. 608,836

3 Claims. (Cl. 195—36)

This invention relates to processes for the manufacture of penicillin involving fermentation and more particularly to a method whereby the yield of penicillin X is substantially increased.

The production of penicillin is accomplished by the fermentation of an aqueous medium with a micro-organism, such as *Penicillium notatum*, *Penicillium chrysogenum*, or other members of the *Penicillium chrysogenum* series of molds. Representative strains are *Penicillium notatum* (NRRL strain No. 832) and *Penicillium chrysogenum* (NRRL strain No. 1951–B25). The fermentation is usually carried out in one of two ways designated in the art as the "bottle" process and the "submerged fermentation" process, respectively. In the first, or bottle process, the medium is placed in shallow layers in flasks or bottles and the layer inoculated on the surface with a pure culture of the mold. The flask is allowed to stand under controlled temperature conditions for several days without agitating the liquid, after which the thick mat of mold growth which forms on the surface of the liquid is removed and liquid itself clarified and worked up for the recovery of penicillin.

In the submerged fermentation process an aqueous medium favorable to the growth of the penicillin-producing micro-organism is inoculated with the organism and the mixture stirred and aerated, preferably with sterile air, for several days under carefully controlled conditions. The mixture of liquid and suspended organisms, which has the consistency of a thin batter, is clarified, e. g. by adding a filter aid and filtering, and penicillin recovered from the clarified liquid. Although both methods are used commercially, the submerged fermentation process is of particular value due to the fact that the mixture of organism and medium may be handled in large quantities in vats or other suitable vessels by conventional methods used in transferring, agitating and otherwise handling liquids. The submerged fermentation process has been developed to the point where the fermentation brew may, after clarification, contain about five to six per cent of the penicillin as the X-type.

One of the recovery processes most commonly used comprises first clarifying the brew by adding a filter aid such as porous clay and filtering. The clarified brew contains about 90 per cent of the penicillin in the original unclarified brew. The clarified brew is then stirred with activated carbon which adsorbs most of the penicillin from the brew. The mixture is then filtered and the carbon filter cake containing the penicillin is extracted with dilute acetone or amyl acetate-water. Another recovery process involves a straight solvent extraction with amyl acetate.

One method of recovering penicillin from the amyl acetate extract obtained as above-outlined, comprises washing the extract with sufficient of a dilute aqueous alkali, such as aqueous sodium bicarbonate or aqueous potassium hydroxide, to raise the pH of the mixture to about 7. The mixture is allowed to separate into layers and the aqueous layer, which in commercial practice retains from thirty to forty-five per cent of the original activity of the clarified brew, is separated from the amyl acetate and concentrated or dried to form the final penicillin-containing product. The total quantity of the final penicillin-containing product usually is not more than 0.1 gram per liter of brew with which the production was started and this represents about 50,000 Oxford units of penicillin per liter of the original brew, of which not more than about five or six per cent is the X-type.

It is thus apparent that by the use of heretofore known methods for the production of penicillin X, undesirably low yields of the final product are obtained. Because of the great importance and value of penicillin X in the treatment of numerous pathological conditions and because of the extremely large demand for the product many investigators are working intensely in attempts to increase the yield of penicillin X by the use of modifications of known methods. For instance, it is known that some organic substance which is present in brown sugar slightly enhances penicillin formation. However, the including of substances thought to be related to the said organic substance does not promote penicillin formation. The presence of certain metals in the culture medium seems to promote the rate of penicillin formation, but the addition thereof does not substantially increase the total yield of penicillin. Moreover, none of these procedures has been shown to promote the yield of the X-type of penicillin. Realizing the great demand for penicillin X and the extremely low yields of this product obtained by any of the known methods we have directed our search toward finding a substance, which, when added to the culture medium will promote the rate of production of penicillin and produce proportionately higher yields of the X-type product, without necessitating expansion of equipment.

We have now discovered such a substance and have accordingly invented a method by the use of which we are able to increase materially the formation of penicillin X during the fermentation period and are now able to obtain higher yields in the final product than was possible by the use of any of the previously known methods.

It is therefore an object of the present invention to provide a method for the production of penicillin X in increased yield. It is a further object of the present invention to provide a method for the production of penicillin X in increased yield without necessitating a corresponding expansion of the equipment used. Still another object is to provide a way of increasing the rate of production of penicillin.

These and related objects are accomplished readily by adding para-hydroxyphenylacetic acid to the culture medium. Said acid is added in small amounts and we have found that the presence of three-hundredths of one per cent of it in the culture medium substantially increases the rate of formation of penicillin, and gives a high yield of the X-type of penicillin in the final product. The para-hydroxyphenylacetic acid may be added to the other ingredients which comprise the culture medium at any time prior to completion of the incubation period, preferably before the incubation is started. While the presence of about 0.03 per cent of para-hydroxyphenylacetic acid in the liquid culture medium appears to be the optimum amount, both from the standpoint of results of the final product and the economy of use of the added agent, we may use between about 0.003 and about 0.1 per cent, by weight to volume, of para-hydroxyphenylacetic acid.

Certain advantages of our invention are apparent from a comparison of the following examples with a representative conventional procedure of penicillin production.

Following the conventional method, one thousand milliliters of aqueous medium was prepared which contained the following components suspended in distilled water: Three grams of calcium carbonate; twelve-hundredths gram of zinc sulfate heptahydrate; thirty-eight grams of lactose, and sixty milliliters of corn steep liquor. The medium was sterilized, inoculated with a pure culture of *Penicillium chrysogenum* (NRRL strain No. 1951-B25) and incubated at 22 to 23 degrees centigrade for about 124 hours. The mixture was shaken and aerated during this time in conventional manner. At the end of the fermentation period the brew contained about 105 Oxford units of penicillin per milliliter.

The brew was extracted portionwise with an equal volume of amyl acetate acidified to pH 2 and maintained at a temperature of 0 degrees centigrade. The amyl acetate extract was further extracted with a phosphate which was buffered to pH 7. It was then acidified to pH 2, cooled to 0 degrees centigrade and extracted with ether. About 75 per cent of the penicillin which was present in the brew was thus recovered. Of this amount of penicillin, about five to about six per cent was the X-type material.

The following example illustrates the practice of our invention but is not to be construed as limiting the same:

The procedure of the conventional method described above was followed, but 0.30 gram of para-hydroxyphenylacetic acid was added to the culture medium. About 75 per cent of the penicillin which was present in the brew was recovered. Of this amount of penicillin, about 28 per cent was the X-type material.

On the basis of repeated experiments, the brew reached a maximum potency earlier in the fermentation period, and we averaged about 46 per cent more activity in the brew, measured in Oxford units per milliliter, at the peak of penicillin production where the para-hydroxyphenylacetic acid was used, in comparison with the conventional method, after the same time interval.

The use herein of the terms "fermentation," "fermentation brew," and related terms, to refer to the growing of micro-organisms of the *Penicillium chrysogenum* series of molds in aqueous media, to brew resulting from such growth, etc., is in keeping with the nomenclature and terminology which has arisen in the penicillin art wherein such processes and products are regularly referred to as fermentation processes and fermentation products. Assay of penicillin-containing products referred to herein was accomplished by a modification of the agar cup-plate method described in Circular 198 of the United States Department of Agriculture.

We claim:

1. In a submerged fermentation method for producing penicillin X, the step of adding a nontoxic amount of para-hydroxyphenylacetic acid to the liquid culture medium in amount between about 0.003 and about 0.1 weight per cent of the total volume of said medium.

2. The method as claimed in claim 1 wherein para-hydroxyphenylacetic acid is added to the liquid culture medium in the amount of three-hundredths per cent of the total volume of said medium.

3. In a submerged fermentation method of producing penicillin X by growing a penicillium mold of the notatum-chrysogenum group in association with an aqueous culture medium, the improvement which comprises incorporation in the said medium an effective amount less than 0.1 weight percent of para-hydroxyphenyl acetic acid.

GEORGE F. CARTLAND.
WILLIAM J. HAINES.
NESTOR BOHONOS.

REFERENCES CITED

The following references are of record in the file of this patent:

UNITED STATES PATENTS

| Number | Name | Date |
|---|---|---|
| 2,423,873 | Coghill | July 15, 1947 |
| 2,440,361 | Behrens et al. | Apr. 24, 1948 |

OTHER REFERENCES

Coghill: Monthly Progress Report No. 16, Nov. 20, 1943, Committee on Medical Research of the O. S. R. D., page 2; ibid., No. 19, Apr. 27, 1944, pages 1 to 5.

Coghill: "Penicillin" Interim Report No. 23, April 2, 1945. U. S. D. A.,RS/B36-201, Summary (2 pages) and page 12.